United States Patent
Prehn

(10) Patent No.: US 11,103,022 B2
(45) Date of Patent: Aug. 31, 2021

(54) SYNCHRONIZED SAFETY LIGHTING

(71) Applicant: Arsenal Cycling LLC, Boulder, CO (US)

(72) Inventor: Thomas Prehn, Boulder, CO (US)

(73) Assignee: ARSENAL CYCLING LLC, Boulder, CO (US)

( * ) Notice: Subject to any disclaimer, the term of this patent is extended or adjusted under 35 U.S.C. 154(b) by 0 days.

(21) Appl. No.: 15/681,185

(22) Filed: Aug. 18, 2017

(65) Prior Publication Data

US 2018/0050751 A1     Feb. 22, 2018

Related U.S. Application Data

(60) Provisional application No. 62/377,396, filed on Aug. 19, 2016.

(51) Int. Cl.
| | |
|---|---|
| *A42B 3/04* | (2006.01) |
| *A41D 13/01* | (2006.01) |
| *G08B 5/38* | (2006.01) |
| *G08B 5/00* | (2006.01) |
| *H05B 45/10* | (2020.01) |
| *H05B 47/155* | (2020.01) |
| *B62J 6/01* | (2020.01) |
| *B62J 6/165* | (2020.01) |

(52) U.S. Cl.
CPC .............. *A42B 3/044* (2013.01); *A41D 13/01* (2013.01); *B62J 6/01* (2020.02); *G08B 5/006* (2013.01); *G08B 5/38* (2013.01); *H05B 45/10* (2020.01); *H05B 47/155* (2020.01); *B62J 6/165* (2020.02)

(58) Field of Classification Search
CPC ............................ B62J 6/001; B62J 2006/008
See application file for complete search history.

(56) References Cited

U.S. PATENT DOCUMENTS

| | | | | |
|---|---|---|---|---|
| 5,704,707 | A * | 1/1998 | Gebelein | A42B 3/0453 340/479 |
| 6,936,978 | B2 * | 8/2005 | Morgan | H05B 47/10 315/291 |
| 8,909,424 | B2 * | 12/2014 | Jordan | F16H 59/044 701/36 |
| 2004/0184266 | A1 | 9/2004 | Krumholz | |
| 2005/0275193 | A1 * | 12/2005 | Lee | B60Q 1/2673 280/468 |
| 2007/0063831 | A1 * | 3/2007 | Perkins | B60Q 1/2673 340/479 |

(Continued)

FOREIGN PATENT DOCUMENTS

WO    WO 2010/097742 A1 *   9/2010 ............. H05B 37/02

*Primary Examiner* — Evan P Dzierzynski
(74) *Attorney, Agent, or Firm* — Holzer Patel Drennan

(57) ABSTRACT

Under poor lighting conditions, it is difficult to distinguish whether multiple lights are attached to the same object or multiple objects, particularly when they are flashing. In some circumstances, lights flashing at different frequencies and/or with different periods may be presumed by other road users to be associated with different objects, thereby diminishing the value of multiple individual lights on a bicycle. Synchronized safety lighting enables a cyclist to synchronize multiple individual lights so that they may flash in unison with the same repeating pattern. This provides a stronger visual impression of a cyclist and their bicycle to other road users by visually tying the cyclist's lights together.

20 Claims, 4 Drawing Sheets

(56) References Cited

U.S. PATENT DOCUMENTS

| | | |
|---|---|---|
| 2008/0136660 A1 | 6/2008 | Bailey |
| 2010/0253501 A1 | 10/2010 | Gibson |
| 2012/0098439 A1 | 4/2012 | Recker et al. |
| 2015/0146449 A1 | 5/2015 | Freiser |
| 2015/0250043 A1* | 9/2015 | Timmerberg .......... A41D 13/01 315/153 |
| 2016/0144775 A1* | 5/2016 | Ejiawoko ............. B60Q 1/2673 340/465 |

* cited by examiner

SYNCHRONIZED SAFETY LIGHTING

CROSS-REFERENCE TO RELATED APPLICATIONS

The present application claims benefit of priority to U.S. Provisional Patent Application No. 62/377,396, entitled "Synchronized Safety Lighting" and filed on Aug. 19, 2016, which is specifically incorporated by reference herein for all that it discloses or teaches.

BACKGROUND

Bicycle lighting is illumination attached to a bicycle and/or an associated cyclist to improve visibility of the bicycle and the cyclist to other road users (e.g., automobiles, pedestrians, and other cyclists), under poor ambient illumination (e.g., at dusk, dawn, or night) and/or during daylight conditions as well. A secondary purpose of bicycle lighting is to illuminate the roadway so that the cyclist may adequately see in the bicycle's direction of travel. As a result, the use of bicycle lighting for riding under poor ambient illumination is generally recommended or required by authorities as a basic safety precaution, even in relatively well-lit urban environments.

Many cyclists utilize a white light in the front and a red light in the back, one or both of which may operate in a flashing mode to attract attention to the cyclist's presence and distinguish the cyclist from other illuminated structures or vehicles in the cyclist's vicinity. In an effort to improve illumination and thereby improve visibility, many cyclists will attach more than the basic two individual lights to their bicycle or person. However, under poor lighting conditions, it is difficult to distinguish whether multiple lights are attached to the same object or multiple objects, particularly when they are flashing. In some circumstances, lights flashing at different frequencies and/or with different periods may be presumed by other road users to be associated with different objects, thereby diminishing the value of multiple individual lights on a bicycle.

SUMMARY

Implementations described and claimed herein address the foregoing problems by providing a synchronizable light comprising circuitry to join to one or more other synchronizable lights within a wireless network of lights and a control selector to trigger the circuitry to join the wireless network of lights.

Implementations described and claimed herein address the foregoing problems by further providing a method of synchronizing a wireless network of lights comprising powering a first light in a synchronizable mode, powering a second light in the synchronizable mode, and joining the first light to the second light within the wireless network so that a light source within each of the lights flashes in unison.

Implementations described and claimed herein address the foregoing problems by still further providing a wireless network of synchronized lights comprising a first light including first circuitry joining the first light to the wireless network, the first light further including a first control selector to trigger the first circuitry to join the wireless network; and a second light including second circuitry to join the second light to the wireless network, the second light further including a second control selector to trigger the second circuitry to join the wireless network.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The presently disclosed technology enables a cyclist to synchronize multiple individual lights so that they may flash in unison with the same repeating pattern. Synchronized safety lighting provides a stronger visual impression of a cyclist and their bicycle to other road users by visually tying the cyclist's lights together.

Figure 1:
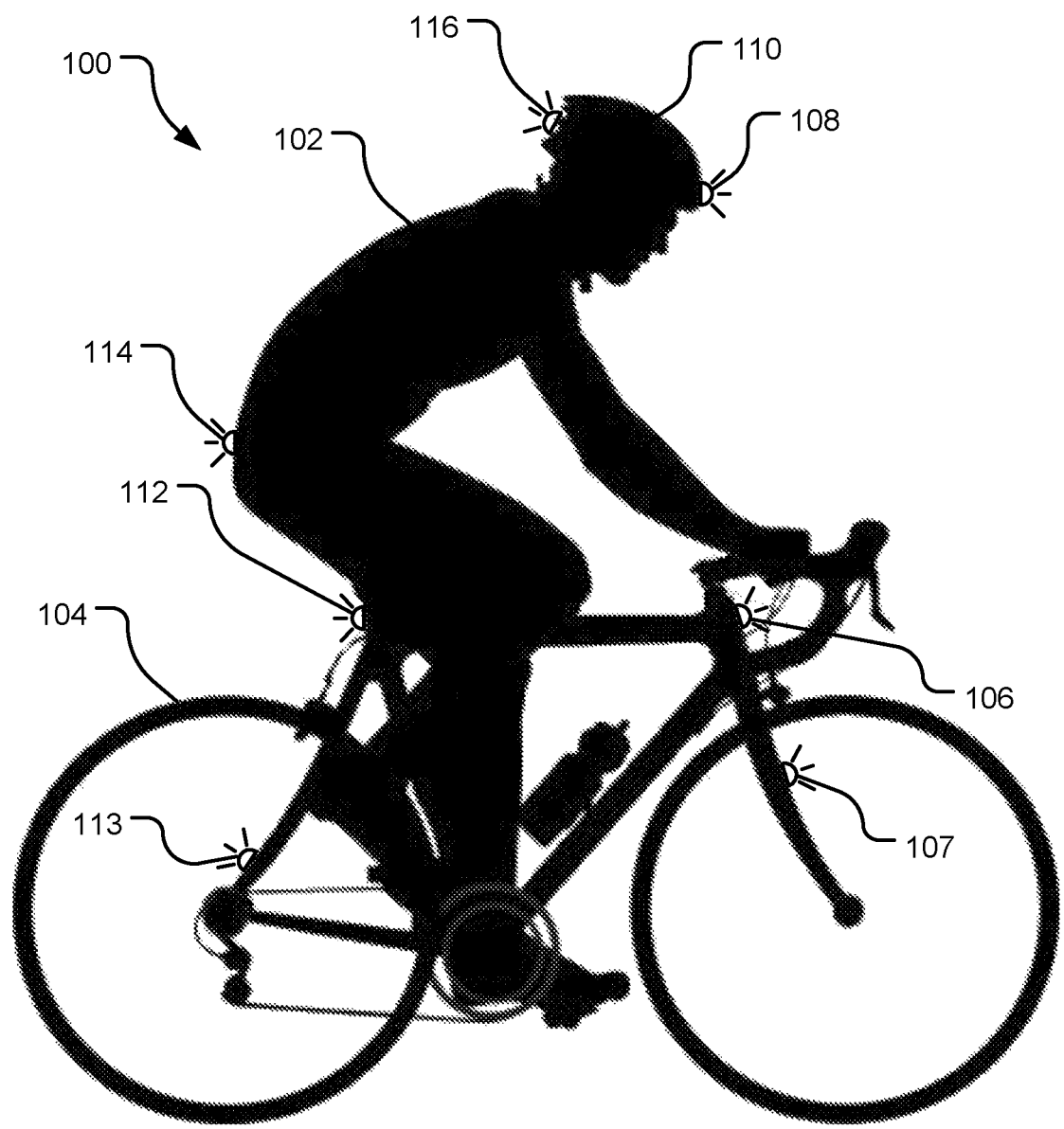
FIG. 1 illustrates a cyclist utilizing an example synchronized safety lighting system.

FIG. 1 illustrates a cyclist 102 utilizing an example synchronized safety lighting system 100. The cyclist 102 is depicted riding a bicycle 104. While a road bike is depicted, the system 100 may be used with any style of bicycle, other types of vehicles, or a pedestrian, for example. An array of individual lights (e.g., light 106) are attached to the cyclist 102 and/or the bicycle 104. More specifically, lights 106, 107 are each attached to a front portion of the bicycle 104 and may be used both to illuminate the bicycle 104 for other road users and to illuminate the road and other objects for the cyclist 102. Light 108 is attached to a front portion of the cyclist's helmet 110 and may be used both to illuminate the cyclist 102 for other road users and to illuminate the road and other objects for the cyclist 102. In various implementations, lights 106, 108 are white or amber in color.

Lights 112, 113 are attached to a rear portion of the bicycle 104 and may be used primarily to illuminate the bicycle 104 for other road users. Light 114 is attached to the cyclist 102 (or an article of clothing or other accessory the cyclist is wearing) and light 116 is attached to a rear portion of the cyclist's helmet 110. Each of the lights 112, 114, 116 may be used primarily to illuminate the cyclist 102 for other road users. In various implementations, lights 112, 114, 116 are red in color.

In one implementation, each of the lights 106, 107, 108, 112, 113, 114, 116 are synchronized to one another over a communication network so that they flash in unison with the same repeating pattern, or in other implementations, they don't flash. In yet another implementation, each of the lights 106, 107, 108 are synchronized to a first pattern, intensity, frequency, and/or period of oscillation and each of the lights 112, 113, 114, 116 are synchronized to a second pattern, intensity, frequency, and/or period of oscillation. Other combinations of two or more lights synchronized to one or more communication networks are contemplated herein.

In situations where the cyclist 102 is riding with other cyclists, the lights 106, 107, 108, 112, 113, 114, 116 may be synchronized in a first pattern, intensity, frequency, and/or period of oscillation and second set of lights (not shown) associated with a second cyclist may be synchronized in a second pattern, intensity, frequency, and/or period of oscillation order, and so on, to visually distinguish each of the cyclists within the group of cyclists. In another implementation, each of the lights 106, 107, 108, 112, 113, 114, 116 and additional lights associated with additional cyclists within a group could all be synchronized together to project a larger illuminated object to other road users.

Each of the lights 106, 107, 108, 112, 113, 114, 116 are independently powered and synchronized over a wireless communication network. As a result, the cyclist 102 may spread out the individual lights on the bicycle 104 and/or on his person without concern with connecting wires. Spread out lights tend to achieve a stronger visual impression on other road users, and also may afford the other road users the ability to judge closure speed to the bicycle 104 based on a perceived rate that the individual lights 106, 107, 108, 112, 113, 114, 116 are diverging from one another. While seven (7) individual lights 106, 107, 108, 112, 113, 114, 116 are shown in FIG. 1, the system 100 may operate with any number of individual lights greater than one.

Figure 2:
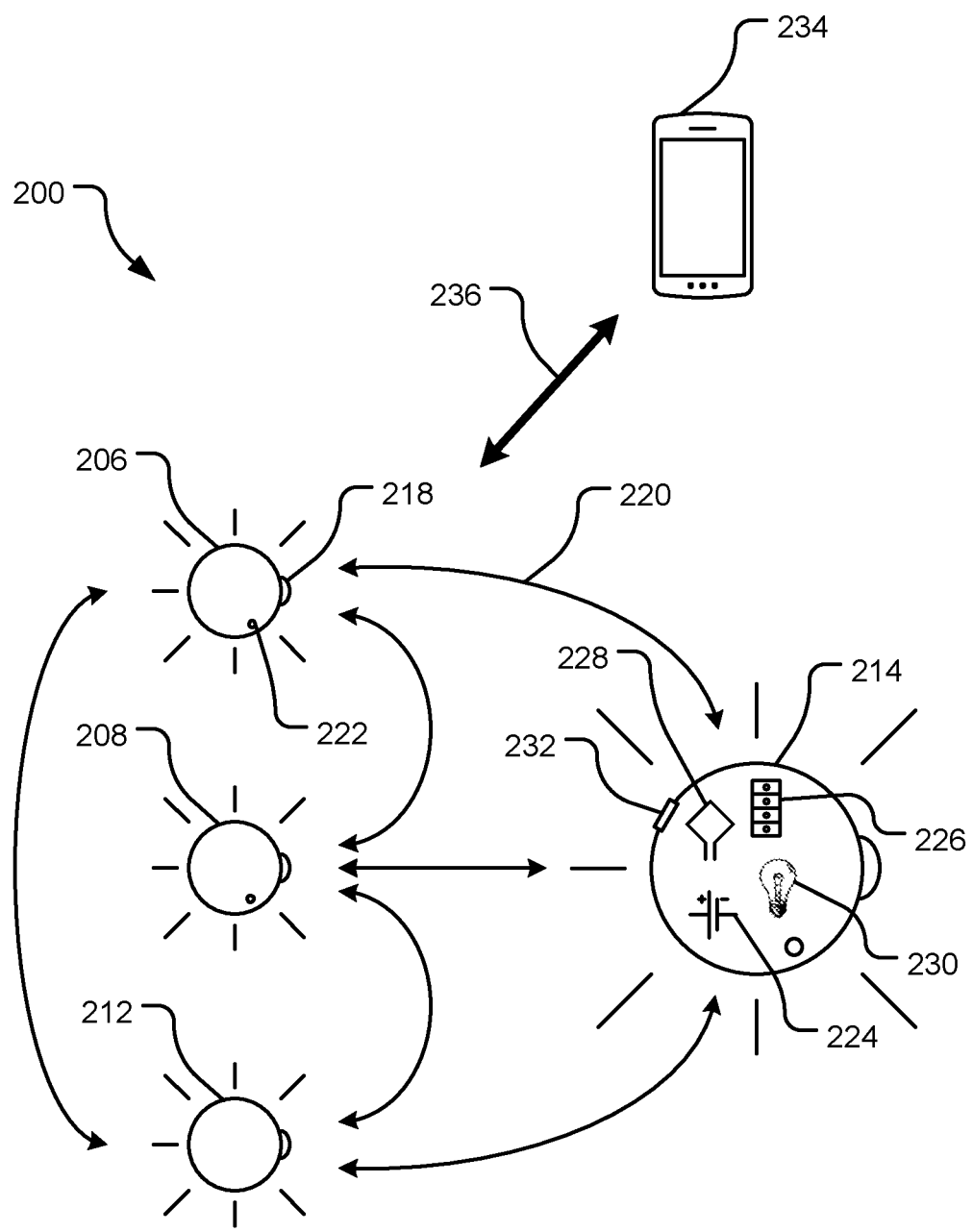
FIG. 2 illustrates a schematic diagram of an example synchronized safety lighting system.

FIG. 2 illustrates a schematic diagram of an example synchronized safety lighting system 200. Each of lights 206, 208, 212, 214 are equipped with a control button or selector (e.g., control button 218) that controls operation of the associated light and a reset button or selector (e.g., reset button 222) that resets operation of the associated light. In various implementations, sequences of successive pressing the control button activates different features of an associated light and pressing the reset button returns an associated light to a default state. In other implementations, there may be additional buttons or other actuators or selectors on each light that may achieve similar results.

In an example implementation, the control button 218 is pressed for period of time, or a press-and-hold (e.g., pressed and held over 1 or 2 seconds), to turn the light 206 on and off. A short singular press of the control button 218, or a single-click, while the light 206 is on will cycle through available flash modes (e.g., constant high-intensity, constant low-intensity, pulsing, slow flash, standard flash, and rapid flash). Two short successive presses of the control button 218, or a double-click (e.g., pressed and released twice within 1 or 2 seconds), turns network access (or synchronization mode) of the light 206 on and off. More specifically, if the light 206 is on, but not within a network, a double-click of the control button 218 will trigger the light 206 to search for other lights (also in synchronization mode) and establish a network with those lights, and store a code that defines the network. In various implementations, synchronization mode runs for a predetermined period of time (e.g., 30 seconds) and once a network of lights with a common code is established and the synchronization mode expires, the number of lights within the network becomes fixed and additional lights may not be added to the network. If no other lights are available to establish a network, the light 206 may eventually time out and return to an independent mode.

If the light 206 is on and already connected to a network of other lights, a double-click of the control button 218 will cause the light 206 to exit the network, but keep the network code and stay on, and operate independently. A subsequent double-click of the control button 218 will cause the light 206 to rejoin the same network based on the stored code. Similarly, if the light 206 is turned off and subsequently turned back on, the network code remains stored within the light 206 and the light 206 rejoins the prior network, if available. If not, the light 206 enters an independent mode.

In order to create a new network of lights, each of the lights that already have a network code stored are reset (e.g., by depressing the reset button 222), which clears the code and allows each of the lights to reenter a synchronization mode and create a new network of lights with other lights in synchronization mode. The user maintains control over the network by initially establishing the network under conditions the user controls. Additional lights are prevented from joining the user's network and/or controlling the user's network under later conditions that the user may or may not control.

Further, once two or more lights are networked together, use of the control button 218 on the light 206 (or a control button of any other light within the network) will control all of the lights (except the double-click) within the network. For example, a single click on the light 206 will trigger all the connected lights to change to a different flash mode that is synchronized to the light 206. Similarly, a press-and-hold of the control button 218 will not only turn the light 206 off, but all the other lights connected to the light 206. Further, lights connected within a network remember their network for at least a period of time after being turned off (e.g., 60 minutes). As a result, a press-and-hold on the control button 218 on the light 206 will turn all the lights within the network back on. In various implementations, the latest in time depression of one of the control buttons of the lights within the network controls the entire network of lights. Further, if one of the lights moves out of range from the other lights within a network, the light may enter an independent mode and automatically rejoin the network once it reenters the range of the other light(s).

Each of the lights 206, 208, 212, 214 has the ability to selectively connect to other lights that are within range in an effort to synchronize with other lights. Arrows (e.g., arrow 220) illustrate that each of the lights 206, 208, 212, 214 has the ability to join an existing network of lights, to serve as a source for a new network of lights, or leave the existing network of light to operate individually or to join a different network of lights. While the system 200 includes four (4) individual lights 206, 208, 212, 214, the system 200 could incorporate any number of additional lights or fewer lights than that depicted. Still further, the lights 206, 208, 212, 214 may have the ability to select from multiple available networks to join in an implementation where there are multiple networks of lights in close physical proximity to one another (e.g., within a group of cyclists riding together).

Light 214 is shown physically larger than lights 206, 208, 212 in an effort to illustrate functional components of each of the lights 206, 208, 212, 214. In various implementations, the lights 206, 208, 212, 214 may be identical or vary in size and shape. Each of the lights 206, 208, 212, 214 may be powered by an internal battery (e.g., battery 224), which may be replaceable or rechargeable. The batteries each power a circuit board (e.g., circuit board 226) within each of the lights 206, 208, 212, 214 that contains firmware that implements the functionality described herein.

Each of the lights 206, 208, 212, 214 further includes an antenna (e.g., antenna 228) that enables the individual lights 206, 208, 212, 214 to join an existing network, start a new network, or leave the existing network. The antennas may be internal and/or external to the individual lights 206, 208, 212, 214. The network may be established over any applicable short-range communication standard (e.g., Bluetooth®, 2.4 Ghz, etc.), and have a predetermined range (e.g., up to 35 meters). The batteries may power any type of light source (e.g., light source 230), such as an array of light-emitting diode(s) or incandescent bulb(s).

Each of the lights 206, 208, 212, 214 may further include an input/output port (e.g., port 232) connected to the circuit board and/or battery within the respective light. The port 232 may serve to charge the battery 224, download updates to the light firmware, and/or upload data regarding the light functionality to a computing device (not shown). The input/output ports may be capable of transmitting power and/or data to/from an associated light and adopt any available physical port format and communication standard (e.g., universal serial bus (USB)).

Further, each of the lights 206, 208, 212, 214 may include one or more additional sensors (e.g., an accelerometer, not shown) that may provide additional functionality to the lights 206, 208, 212, 214. For example, an accelerometer may be used to automatically turn an associated light on when placed in motion. Still further, each of the lights 206, 208, 212, 214 may include a timing circuit within the circuit board that enables each light to maintain period and/or frequency of a selected flash mode, either individually or within a network.

In some implementations, one of the lights (e.g., light 214) is a headlight (used both to illuminate the cyclist for other road users and to illuminate the road and other objects for the cyclist), while the other lights 206, 208, 212 are to illuminate the cyclist for other road users only. The headlight 214 may incorporate a forward-facing light source to illuminate the road and other objects and side-facing peripheral light sources (e.g., radially oriented around the forward-facing light) to illuminate the cyclist for other road users. In such an implementation, the light 214 may be equipped with a second control button (not shown). The first control button controls network access of the forward-facing light source and the second control button controls network access of the peripheral light sources within the light 214. As a result, the user may, for example, put the peripheral light sources in a network with the other lights 206, 208, 212 that flash in unison and keep the forward-facing light source out of the network so that it may stay constant or flash with a different pattern.

In yet another implementation, the individual lights 206, 208, 212, 214 are wirelessly connected to a smartphone 234 or other wireless networked computing device, as illustrated by arrow 236. The smartphone 234 has the ability to control the individual lights in addition to or in lieu of the control button and/or the reset button on each of the lights 206, 208, 212, 214. The smartphone 234 may also be able to monitor status (e.g., on/off state, flash mode, network status, battery life, etc.) of each light and display the status on the smartphone 234.

When the smartphone 234 is used to network the lights 206, 208, 212, 214 together so that they have a synchronized flash mode, timing of the flash mode can be keyed to an internal clock on the smartphone 234 (e.g., networked lights flash at the top of every second). As a result, other lights that are networked together via another smartphone can be keyed to the internal clock on the other smartphone and appear to be networked together (assuming the smartphones maintain an accurate time setting). In this manner, the number of smartphones and connected networks of lights may be scaled up to any number, while appearing to all be on a common network by having a synchronized flash mode.

In various implementations, the internal clock on the smartphone 234 serves as a trigger for setting and starting local timing circuits on each of the lights 206, 208, 212, 214. As a result, the smartphone 234 may not continuously control the flash mode on the lights 206, 208, 212, 214. The smartphone 234 may, however, periodically reset the local timing circuits on each of the lights 206, 208, 212, 214 to ensure that the lights 206, 208, 212, 214 stay synchronized over an extended period of time. The smartphone 234 or the individual lights 206, 208, 212, 214 themselves may be synchronized to various mechanisms for synchronizing time (e.g., current time as per the National Institute of Standards and Technology (NIST) radio signal or Internet Time Service).

In some implementations, the lights 206, 208, 212, 214 are configured to be selectively physically attached together so that the individual light sources within each light are in close proximity to light sources in physically adjacent lights and total lumen output of the lights 206, 208, 212, 214 is additive and more visible in high ambient lighting conditions. The lights 206, 208, 212, 214 may physically selectively attach to one another via magnets, clips, snaps, clasps, hook-and-loop fasteners, or any other suitable selective fastener. In an example implementation, the lights 206, 208, 212, 214 are physically distributed across a cyclist and a bicycle while riding at night to maximize the area illuminated to other road users and the lights 206, 208, 212, 214 are physically attached to one another to concentrate the light at a particular area of the cyclist and/or the bicycle to increase the visibility of the cyclist and the bicycle while riding during the day.

Figure 3:
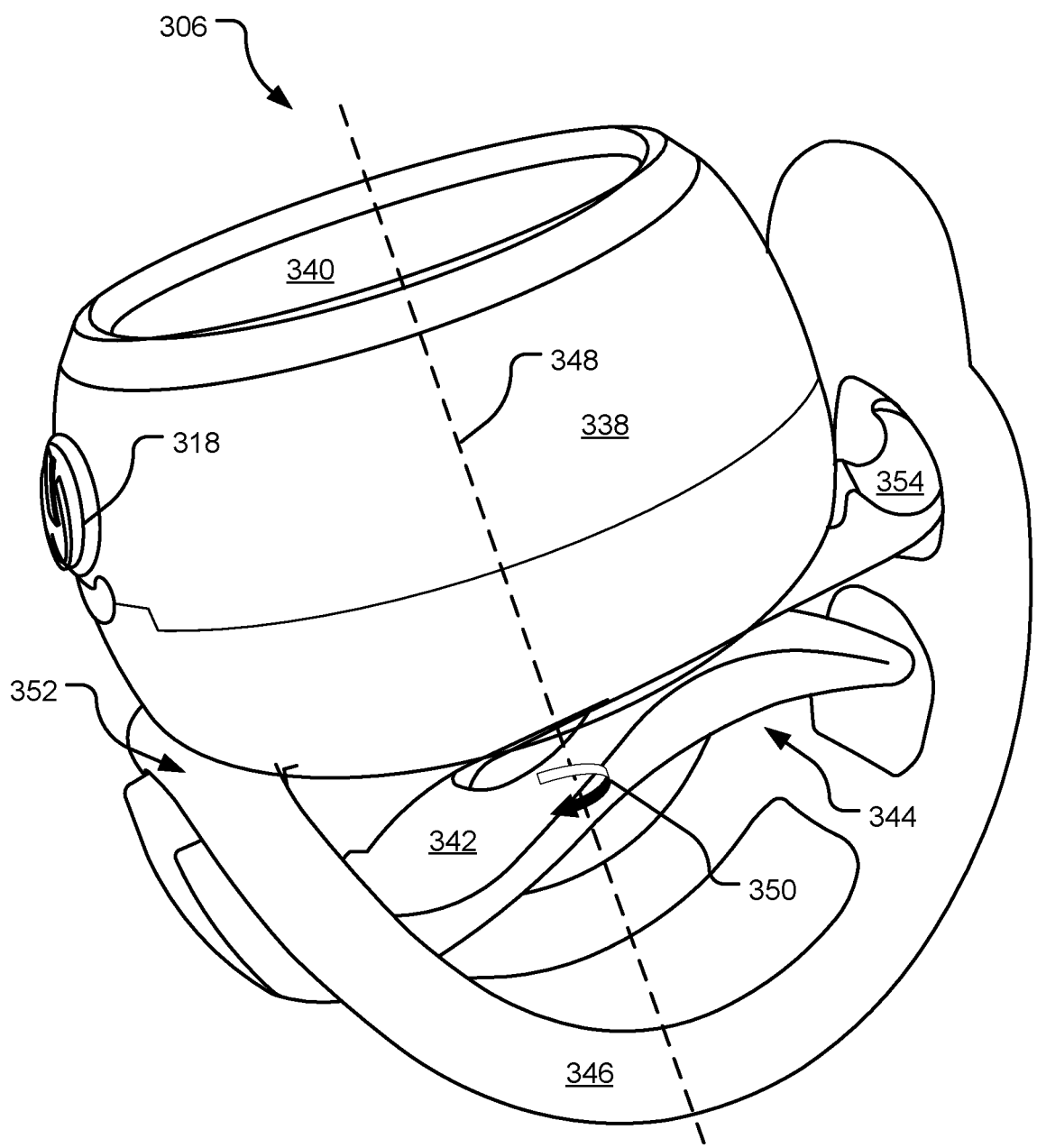
FIG. 3 is a perspective view of an example synchronized safety light.

FIG. 3 is a perspective view of an example synchronized safety light 306. The light 306 is one of a synchronized network of the lights (see e.g., synchronized safety lighting system 100 of FIG. 1) that flash in unison with the same repeating pattern. The light 306 includes a housing 338 that encloses functional components of the safety light 306. More specifically, the housing 338 may enclose an internal battery (see e.g., battery 224), a circuit board (see e.g., circuit board 226), an antenna (see e.g., antenna 228), one or more light sources (see e.g., light source 230), such as an array of discrete light-emitting diodes (LEDs), chip-on-board LEDs, or incandescent bulb(s), and other functional components, as described in detail above with reference to FIG. 2. In various implementations, the light sources may provide 20-60 lumens (or 10-1000 lumens) of light output, and may vary in color and/or intensity depending on whether the light 306 is intended to illuminate a user of the light 306 or illuminate other objects for the user of the light 306. Other implementations may have higher intensity light sources. The circuit board is communicatively coupled to a control button 318) that controls operation of the light 306 and a reset button (not shown, see e.g., reset button 222 of FIG. 2), as also described in detail above with reference to FIG. 2.

The light 306 further includes a lens 340 that is transparent or semi-transparent and permits light generated by the light source(s) to project beyond the light 306. In some implementations, the lens 340 focuses or diffuses the light generated by the light source(s). An input/output port (not shown, see e.g., port 232 of FIG. 2) extends through the housing 338 and is connected to the circuit board and/or battery within the light 306, as also described in detail above with reference to FIG. 2.

The light 306 further includes a clip 342 attached to a rear-facing surface of the housing 338 that permits the light 306 to be selectively attached and removed from an article of clothing or other article sufficiently thin to wedge between opposing surfaces of the clip 342 and remain frictionally secured within the clip 342. The clip 342 includes a curved outer surface 344 that in conjunction with flexible strap 346 may selectively secure the light 306 to objects too large to be friction-fit between the opposing surfaces of the clip 342 (e.g., bicycle handlebars, frames, and seat posts). More specifically, an object is placed adjacent the curved outer surface 344 of the clip 342. The flexible strap 346 is stretched from a fixed attachment point 352, around the object, and selectively removably attached to hook 354. The flexible strap 346 in conjunction with the curved outer surface 344 of the clip 342 compressively securely attaches the light 306 to the object.

The flexible strap 346 may have multiple surfaces that attach to the hook 354 (here, three surfaces are shown) that vary a length of the portion of the flexible strap 346 stretched between the fixed attachment point 352 and the hook 354 to accommodate a variety of object sizes that the light 306 may be attached to. Further, in some implementations, a shim (not shown) is placed between the object and the curved outer surface 344 of the clip 342 to fine tune the fit between the object and the curved outer surface 344, as well as provide a more directionally secure fit of the light 306 to the object.

In some implementations, one or both of the reset button and the input/output port are located on the rear-facing surface of the housing 338 and the clip 342 is selectively rotatable about axis 348 with reference to the housing 338, as illustrated by arrow 350. As a result, the clip 342 may be rotated in a manner that obscures one or both of the reset button and the input/output port depending on the radial position of the clip 342. For example, a first normal operation position may obscure the input/output port and reveal the reset button and a second charging position may obscure the reset button and reveal the input/output port. Further, the clip 342 may provide additional weather and/or contamination protection to the reset button and the input/output port.

Figure 4:
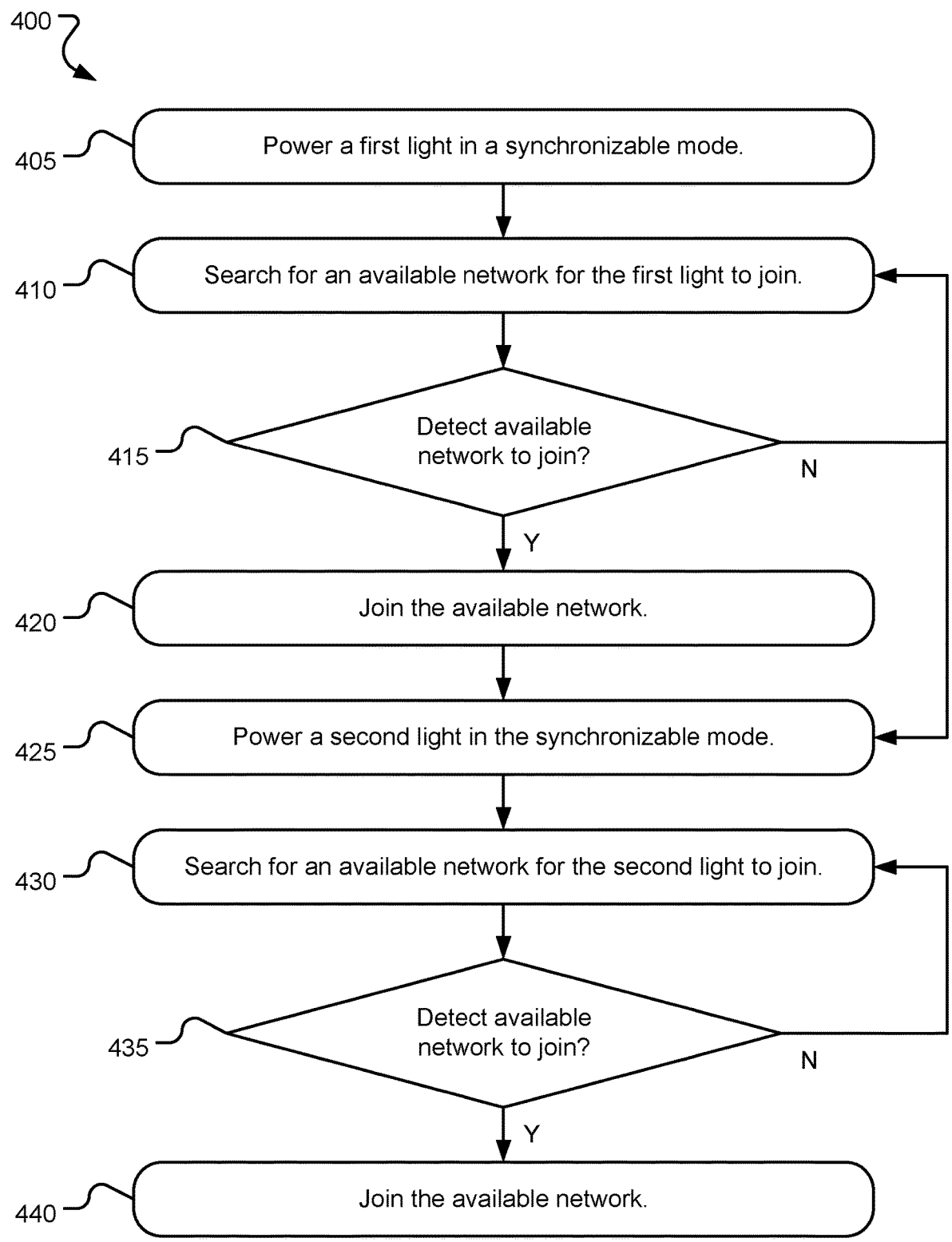
FIG. 4 illustrates example operations for utilizing a synchronized safety lighting system.

FIG. 4 illustrates example operations 400 for utilizing a synchronized safety lighting system. A first powering operation 405 powers a first light in a synchronizable mode. In various implementations, the first powering operation 405 includes a user manipulating a selector (e.g., a button, switch, knob, etc.) on the first light to power up the first light. The user may manipulate the selector again or manipulate a different selector on the first light to put the first light into the synchronizable mode. The first light may include an indicator (e.g., a specific flash pattern) that indicates that the first light is both powered on in the synchronizable mode.

A first searching operation 410 searches for an available network for the first light to join. The available network may be a network with acceptable signal strength and open to receiving additional lights into the network. In various implementations, the first searching operation 410 includes the first light automatically searching for any available networks defined by other lights searching for an available network (or operating on the specified communication frequency of the first light) that are within range. A first decision operation 415 detects whether there is an available network for the first light to join.

If so, a first joining operation 420 joins the first light to the detected available network (defined by lights searching for an available network). In other implementations, if there are multiple detected networks, in various implementations, the first light joins the first network in time with an acceptable signal strength or the network with the strongest signal strength within a predetermined period of time. Further, the first light may remain joined to the network so long as there is an acceptable signal strength. Still further, the first light may remember the joined network and automatically rejoin it even following an interruption (e.g., when the signal strength falls below the acceptable signal strength and then returns to acceptable signal strength). In other implementations, the first light may periodically join a new network that has a stronger signal than the network the first light was previously joined to.

If there is no available network to join, searching operation 410 continues to search for an available network to join. In some implementations, the searching operation 410 only continues for a predetermined period of time. If the searching operation 410 fails to find an available network to join within the predetermined period of time, the first light will continue operating independently. In some implementations, if there is no available network to join, the first light may serve as a new available network for additional lights searching to join a network (e.g., the second light discussed in detail below).

A second powering operation 425 powers a second light in the synchronizable mode. In various implementations, the second powering operation 425 includes a user manipulating a selector on the second light to power up the second light. The user may manipulate the selector again or manipulate a different selector on the second light to put the second light into the synchronizable mode. The second light may include an indicator that indicates that the second light is both powered on in the synchronizable mode.

A second searching operation 430 searches for an available network for the second light to join. In various implementations, the second searching operation 430 includes the first light and the second light detecting one another and forming a new network with each other (and/or additional lights searching for an available network). In other implementations, the second light automatically searches for any available networks operating on a specified communication frequency of the second light that are within range. A second decision operation 435 detects whether there is an available network for the second light to join.

If so, a second joining operation 440 joins the second light to the detected available network. If there are multiple detected available networks, in some implementations, the second light joins the first network in time with an acceptable signal strength or the network with the strongest signal strength within a predetermined period of time. Further, the second light may remain joined to the network so long as there is an acceptable signal strength. Still further, the second light may remember the joined network and automatically rejoin it even following an interruption. In other implementations, the second light may periodically join a new network that has a stronger signal than the network the second light was previously joined to.

Once a light (e.g., the first light and/or the second light) is joined to a network, the light will adopt a flash pattern shared by all lights within the network so that they flash in unison. Further, each light in the network may be utilized to control aspects of all the lights within the network (e.g., each light can be used to change the flash pattern of all lights within the network and to turn on and off all the lights within the network).

In various implementations, the second joining operation 440 joins the second light to the first light. Alternatively, the second joining operation 440 may join the second light to a different available network than the first light was joined to in the first joining operation 420. Still further, one or both of the first light and the second light may serve as available networks for additional lights searching to join a network (e.g., a third light, a fourth light, a fifth light, and so on). If there is no available network to join, the second searching operation 430 continues to search for a network to join. In some implementations, the searching operation 430 only continues for a predetermined period of time. If the searching operation 430 fails to find an available network to join within the predetermined period of time, the second light will continue operating independently. Further, the operations 400 may be repeated to add any number of lights to any number of available networks. Still further, any one or more of the lights joined to the network may be selectively removed from the network and operated independently from the network, or joined to a different network by repeating operations 400.

Implementations of the technology described herein are implemented as logical steps in one or more computer systems. The logical operations may be implemented (1) as a sequence of processor-implemented steps executing in one or more computer systems and (2) as interconnected machine or circuit modules within one or more computer systems. The logical operations may also be implemented using a battery, an antenna, one or more user selectors, one or more indicators, etc. on each synchronizable light. The implementation is a matter of choice, dependent on the performance requirements of the computer system implementing the technology. Accordingly, the logical operations making up the implementations of the technology described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

While the various synchronized safety lighting systems are described herein with specific reference to bicycles and cyclists, the synchronized safety lighting systems may also be applied to pedestrians or other vehicles.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A synchronizable light comprising:
    circuitry to selectively directly join to one or more other synchronizable lights, each synchronizable light independently connected to a wireless network of lights;
    a user control selector to trigger the circuitry to join the wireless network of lights in response to physical manipulation of the user control selector; and
    a light source that flashes in unison with corresponding light sources of the other synchronizable lights when joined to the wireless network of lights and flashes independently of the corresponding light sources of the other synchronizable lights when separated from the wireless network of lights.

2. The synchronizable light of claim 1, the circuitry further to selectively control the other synchronizable lights within the wireless network of lights and selectively be controlled by one of the other synchronizable lights within the wireless network, both in response to physical manipulation of the user control selector.

3. The synchronizable light of claim 1, further comprising:
    a user reset selector to trigger the circuitry to return to a default state.

4. The synchronizable light of claim 1, further comprising:
    an input/output port to provide one or both of power and data to the circuitry.

5. The synchronizable light of claim 1, further comprising:
    a clip to removably attach the synchronizable light to an object.

6. The synchronizable light of claim 5, further comprising:
    a strap to removably stretch from a fixed attachment point to a hook on the clip with the object oriented between the clip and the strap.

7. The synchronizable light of claim 5, the clip to selectively rotate to obscure one or both of a reset selector and an input/output port of the synchronizable light.

8. The synchronizable light of claim 1, further comprising:
    one or more fasteners to physically attach the synchronizable light to one or more of the other synchronizable lights within the wireless network of lights.

9. The synchronizable light of claim 1, the user control selector further to trigger the circuitry to leave the wireless network of lights.

10. The synchronizable light of claim 1, wherein the circuitry permits the synchronizable light to selectively function as one of a transmitter to and a receiver from the wireless network of lights.

11. A method of synchronizing a wireless network of lights comprising:
    powering a first light in a synchronizable mode;
    powering a second light in the synchronizable mode;
    joining the first light directly to the second light within the wireless network in response to a first physical manipulation of a user control selector, each light independently connected to the wireless network, so that a light source within each of the first light and the second light flashes in unison; and
    removing the second light from the wireless network in response to a second physical manipulation of the user control selector so that the light source within the second light flashes independently of the light source within the first light.

12. The method of claim 11, further comprising:
    changing a flash mode on the first light via the user control selector; and
    automatically changing the flash mode of the second light to match the first light via the wireless network.

13. The method of claim 11, further comprising:
    powering down the first light via the user control selector; and
    automatically powering down the second light via the wireless network.

14. The method of claim 11, wherein the first light and the second light each selectively function as one of a transmitter to and a receiver from the wireless network.

15. A wireless network of synchronized lights comprising:
    a first light including first circuitry to independently join the first light to the wireless network, the first light further including a first user control selector to trigger the first circuitry to join the wireless network in response to physical manipulation of the first user control selector; and
    a second light including second circuitry to independently join the second light directly to the first light within the wireless network, the second light further including a second user control selector to trigger the second circuitry to join the wireless network in response to physical manipulation of the second user control selector.

16. The wireless network of synchronized lights of claim 15, wherein any one of the synchronized lights within the wireless network may be used to control all other synchronized lights within the wireless network.

17. The wireless network of synchronized lights of claim 15, wherein each of the first light and the second light includes a light source that flashes in unison with corresponding light sources of all other synchronized lights within the wireless network.

18. The wireless network of synchronized lights of claim 15, wherein each of the synchronized lights within the wireless network are arranged on one or both of a cyclist and a bicycle to illuminate the cyclist and the bicycle.

19. The wireless network of synchronized lights of claim 15, further comprising:
   a computing device that controls the wireless network and all the synchronized lights joined thereto.

20. The synchronizable light of claim 15, wherein the first light and the second light each selectively function as one of a transmitter to and a receiver from the wireless network.

* * * * *